(12) United States Patent
Rosenberg et al.

(10) Patent No.: US 12,394,206 B2
(45) Date of Patent: Aug. 19, 2025

(54) WATER BODY MONITORING DEVICE

(71) Applicant: Lifeguard-AI Inc., Wilmington, DE (US)

(72) Inventors: Noson Rosenberg, Brooklyn, NY (US); Alex Kapmar, Yokneham Elit (IL)

(73) Assignee: Lifeguard-AI Inc., Wilmington, DE (US)

( * ) Notice: Subject to any disclaimer, the term of this patent is extended or adjusted under 35 U.S.C. 154(b) by 0 days.

(21) Appl. No.: 18/739,036

(22) Filed: Jun. 10, 2024

(65) Prior Publication Data

US 2025/0209821 A1   Jun. 26, 2025

Related U.S. Application Data

(63) Continuation of application No. 18/735,367, filed on Jun. 6, 2024, now abandoned.
(Continued)

(51) Int. Cl.
*G06V 20/52* (2022.01)
*G06V 10/764* (2022.01)
(Continued)

(52) U.S. Cl.
CPC ............ *G06V 20/52* (2022.01); *G06V 10/764* (2022.01); *G06V 40/10* (2022.01); *H04N 7/183* (2013.01); *H04N 23/51* (2023.01)

(58) Field of Classification Search
CPC . G06T 2207/20081; G06T 2207/20084; G06T 7/0012; G06T 7/70; G06T 1/20;
(Continued)

(56) References Cited

U.S. PATENT DOCUMENTS 12,008,881 B1 * 6/2024 Brand ................... G08B 29/186
2019/0086920 A1 * 3/2019 Miller ..................... B64F 1/364
(Continued)

FOREIGN PATENT DOCUMENTS

CN    106022230 B  *  5/2019  ......... G06K 9/00771
KR    2004078491 A  *  9/2004

OTHER PUBLICATIONS

Alvin H et al. Title: A Video-Based Drowning Detection System (Year: 2002).*

*Primary Examiner* — Masum Billah
(74) *Attorney, Agent, or Firm* — The Roy Gross Law Firm, LLC; Roy D. Gross

(57) ABSTRACT

An artificial intelligence (AI)-based image acquiring device for monitoring water bodies, the device comprising: a body configured to accommodate components of the device, wherein the body is open at its front side; a front cover installed over and covering the open front side of the body; a motherboard residing inside the body and configured to perform computational actions related to the operation of the device and to connect to the internet in order to receive data from remote entities and transmit data to remote entities; at least one buzzer residing inside the body and connected to the motherboard and configured to generate a sound, for example an alarm sound; and an imaging device residing inside the body and connected to the motherboard and configured to acquire images. wherein components of the device that need electrical power to operate are connected to a power source.

15 Claims, 3 Drawing Sheets

Related U.S. Application Data

(60) Provisional application No. 63/613,107, filed on Dec. 21, 2023.

(51) Int. Cl.
*G06V 40/10* (2022.01)
*H04N 7/18* (2006.01)
*H04N 23/51* (2023.01)

(58) Field of Classification Search
CPC ... G06T 2207/30004; G06T 5/50; G06T 5/70; G06T 7/10; G06T 7/11; G06V 20/52; G06V 2201/07; G06V 40/20; G06V 10/454; G06V 10/82; G06V 10/764; G06V 20/05; G06V 10/774; G06V 20/41
USPC ......................................................... 348/143
See application file for complete search history.

(56) References Cited

U.S. PATENT DOCUMENTS

2023/0222804 A1* 7/2023 Ren .................. G06V 10/454
 382/103
2024/0125724 A1* 4/2024 Fujiwara ............ G02B 21/0092

* cited by examiner

WATER BODY MONITORING DEVICE

CROSS-REFERENCE TO RELATED APPLICATION

This application is a Track One Application, which is a continuation of U.S. Ser. No. 18/735,367 filed Jun. 6, 2024, which claims the benefit of priority to U.S. Provisional Patent Application No. 63/613,107, filed Dec. 21, 2023, the entire contents of which is incorporated herein by reference in its entirety.

FIELD

The present subject matter relates to water body monitoring devices. More particularly, the present subject matter relates to artificial intelligence-based image acquiring devices configured to detect living objects in a danger of drowning in water bodies and consequently produce an alarm signal.

BACKGROUND

When human beings or animals get into a water body, there is a danger of drowning of the human beings or animals in the water. Moreover, there are occasions in which there are no other human beings in the vicinity of the water body that may assist the drowning human beings or animals, or call for help from authorities like healthcare authorities, or other rescue authorities.

It is therefore an object of the present subject matter to provide a solution for this need of monitoring water bodies and alerting relevant human beings or authorities when a drowning human being or animal is detected.

SUMMARY

Unless otherwise defined, all technical and scientific terms used herein have the same meaning as commonly understood by one of ordinary skill in the art to which this subject matter belongs. Although methods and materials similar or equivalent to those described herein can be used in the practice or testing of the present subject matter, suitable methods and materials are described below. In case of conflict, the patent specification, including definitions, will control. In addition, the materials, methods, and examples are illustrative only and not intended to be limiting.

According to one aspect of the present subject matter, there is provided an artificial intelligence (AI)-based image acquiring device for monitoring water bodies, the device comprising:
- a body configured to accommodate components of the device, wherein the body is open at its front side;
- a front cover installed over and covering the open front side of the body;
- a motherboard residing inside the body and configured to perform computational actions related to the operation of the device and to connect to the internet in order to receive data from remote entities and transmit data to remote entities;
- at least one buzzer residing inside the body and connected to the motherboard and configured to generate a sound, for example an alarm sound; and
- an imaging device residing inside the body and connected to the motherboard and configured to acquire images, wherein components of the device that need electrical power to operate are connected to a power source, and
wherein the device is configured to be positioned aside a water body and monitor at least one living object in a region of interest that includes at least part of the water body, and produce an alert signal when an event is detected in the region of interest.

According to one embodiment, the front cover comprises a plurality of openings configured to allow passage of light to, or from, components of the device that are accommodated inside the body.

According to one embodiment, the device further comprising a transparent cover installed over the front cover and configured to cover the plurality of openings of the front cover, while allowing passage of light therethrough.

According to one embodiment, the transparent cover comprising a polarizing filter configured to polarize light that passes through the transparent cover toward the imaging device.

According to one embodiment, the device further comprising a transparent cover heater configured to heat the transparent cover.

According to one embodiment, the transparent cover heater is in contact with an inner side of the transparent cover.

According to one embodiment, the body, the front cover and the transparent cover are sealed in a manner that prevents penetration of water, or moisture, or humidity into the device to internal components of the device.

According to one embodiment, the body comprising at its back part a plurality of ventilation slits configured to allow ventilation of components of the device that are accommodated inside the body.

According to one embodiment, the device further comprising a switch on a surface of the device, wherein the switch is configured to switch-on, or switch-off, or switch-on and switch-off operation of the device.

According to one embodiment, the device is configured to be switched-on, or switched-off, or switch-on and switched-off remotely.

According to one embodiment, the device further comprising a ventilator residing inside the body, connected to the motherboard, and configured to ventilate components of the device that are accommodated in the body.

According to one embodiment, the device further comprising an inner shell configured to fit inside the body and accommodate therein components of the device.

According to one embodiment, the device further comprising a connector configured to connect the motherboard to the inner shell.

According to one embodiment, the device further comprising an illumination element comprising at least one light source, connected to the motherboard and configured to illuminate externally to the device.

According to one embodiment, the device further comprising a holder configured to hold the imaging device in place.

According to one embodiment, the motherboard comprises at least one AI algorithm and is configured to operate the at least one AI algorithm.

According to one embodiment, the monitoring of the at least one living object is performed by acquiring at least one image by the imaging device, transmitting the at least one image to the motherboard and analyzing the at least one image by the at least one AI algorithm of the motherboard.

According to one embodiment, the monitoring of the at least one living object comprises: monitoring of at least one living object floating on the water body, or monitoring of at least one living object under the water in the water body, or monitoring of at least one living object aside the water body, or monitoring moving of at least one living object in the water body or aside the water body, or monitoring of standing in place of at least one living object in the water body, or aside the water body, or monitoring direction of movement of at least one living object in the water body, or aside the water body, or monitoring speed of movement of at least one living object in the water body, or aside the water body, or any combination thereof.

According to one embodiment, the device is configured to distinguish between a living object that is in the water body when a head of the living object is above the water and between a living object that is in the water body when a head of the living object is under the water.

According to one embodiment, the device is configured to classify a situation as an event, when the situation is a living object that is entirely under the water in the water body, including the head, for more than substantially 20-30 seconds, and the living object is not moving in the water.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

DESCRIPTION OF THE PREFERRED EMBODIMENTS

Figure 1:
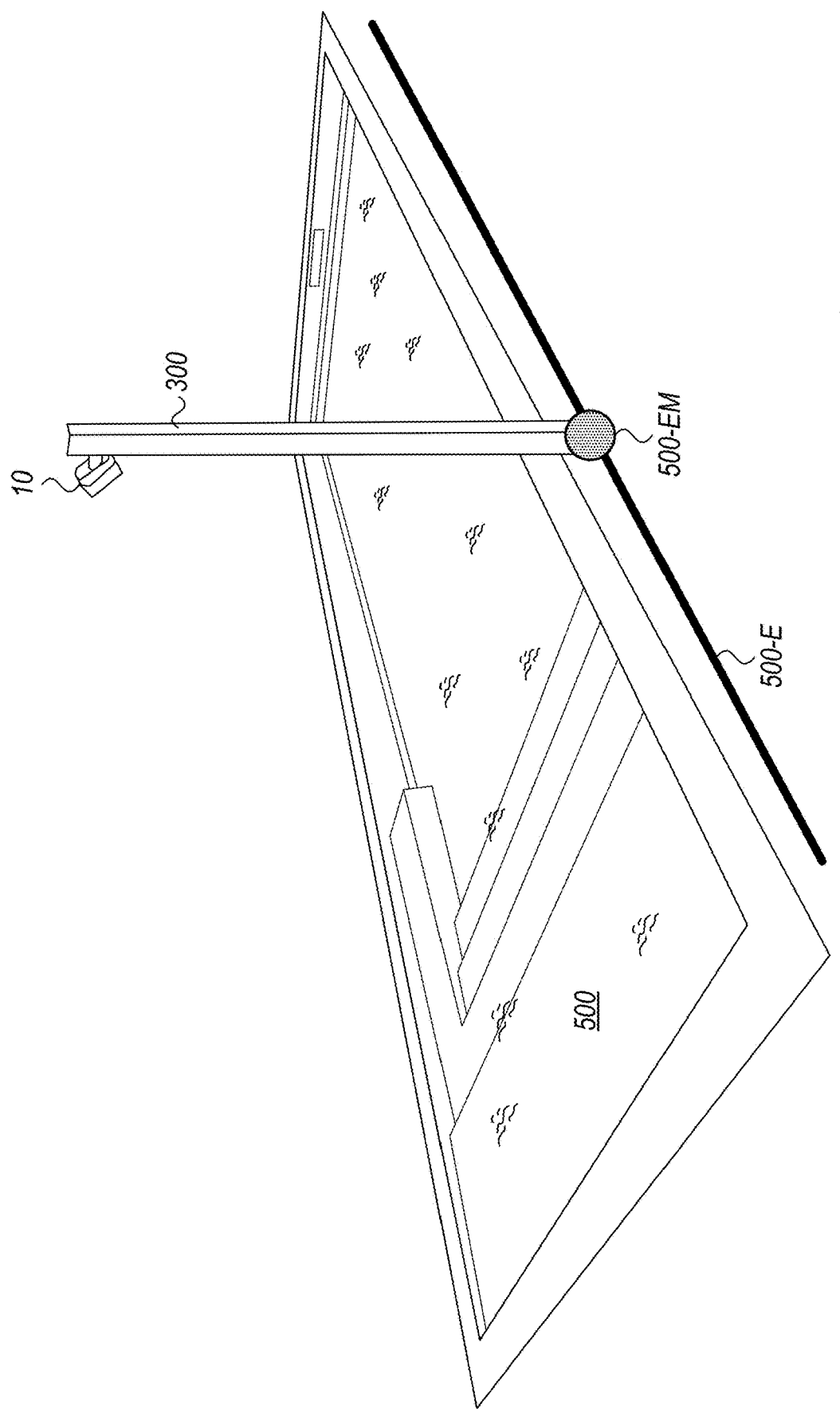
FIG. 1 schematically illustrates, according to an exemplary embodiment, a side perspective view of an AI-based image acquiring device for monitoring water bodies positioned aside a water body.

Before explaining at least one embodiment in detail, it is to be understood that the subject matter is not limited in its application to the details of construction and the arrangement of the components set forth in the following description or illustrated in the drawings. The subject matter is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

In addition, it should be emphasized that any combination of the embodiments of the present subject matter described herein is under the scope of the present subject matter.

The present subject matter provides an artificial-intelligence (AI)-based image acquiring device for monitoring water bodies and producing an alert signal when an at least one living object that is in a danger of death, or injury, is detected in the water body, or aside he water body.

Any type of water body in which there is a danger of drowning of a living object is under the scope of the present subject matter. Some exemplary water bodies include, but not limited to: a swimming pool, an open water reservoir, a water container, a bath tub, a hot tub (Jacuzzi), a lake, a sea, an ocean, and the like.

Any type of living object is under the scope of the present subject matter, for example a human being; a pet animal like a dog or a cat; or any other animal that might drown in the water body.

Referring now to FIG. 1 schematically illustrating, according to an exemplary embodiment, a side perspective view of an AI-based image acquiring device for monitoring water bodies positioned aside a water body. For the sake of simplicity only, the "AI-based image acquiring device for monitoring water bodies" will be occasionally referred to hereinafter as device 10. As can be seen in FIG. 1, the device 10 is positioned in a vicinity of a water body 500 in the form of a swimming pool 500. As mentioned above, a swimming pool 500 is only an example of a water body 500. Therefore, the embodiment shown in FIG. 1 should not be considered as limiting the present subject matter only to swimming pools 500, but rather to any type of water body 500, as detailed above.

According to one embodiment, which may be combined with each other embodiment described herein, the device 10 is configured to be positioned aside a water body 500 and monitor at least one living object in a region of interest that includes at least part of the water body 500, and produce an alert signal when an event is detected in the region of interest, for example a drowning living object is detected in the at least part of the water body.

As can be further seen in FIG. 1, according to one embodiment, which may be combined with each other embodiment described herein, the device 10 is positioned aside the water body 500 in a distance from the water body 500 and at a height that allows acquiring images of at least part of the water body 500. According to another embodiment, which may be combined with each other embodiment described herein, the position, in terms of distance from the body water 500 and height, of the device 10 allows acquiring images of the entire water body 500. According to yet another embodiment, which may be combined with each other embodiment described herein, the position of the device 10 allows acquiring of images of at least one area in a vicinity of the water body 500.

According to an exemplary embodiment, which may be combined with each other embodiment described herein, the device 10 is positioned at a height of substantially 2.5-4 meters above a water level in the water body 500. According to another embodiment, which may be combined with each other embodiment described herein, the device 10 is positioned at a distance of substantially 2-4 meters from the water body 500. It should be noted that the height and the distance of the device 10 from the water body 500 depend one on the other, in order to allow the acquiring of desired images of the water body 500 and of area in a vicinity of the water body 500, as detailed above.

According to one embodiment, which may be combined with each other embodiment described herein, when the water body 500 is small, for example a swimming pool 500, an open water reservoir, a water container, a bath tub, a hot tub (Jacuzzi) and the like, the device 10 is position at a middle of an edge of the water body 500. When the water body 500 is huge, for example a lake, a sea and an ocean, the device 10 is positioned at a middle of an edge of an area of interest that is desired to be monitored by the device 10.

An exemplary presentation of the aforementioned embodiment is given in FIG. 1. FIG. 1 shows a length 500-E of an edge of the swimming pool 500, and the device 10 is positioned at a middle point 500-EM of the length 500-E of the edge. Similarly, when the water body 500 is huge, the area of interest has a shape similar to the shape of the swimming pool 500 shown in FIG. 1. Thus, also the area of interest has an edge having a length 500-E, and the device 10 is positioned at a middle point 500-EM of the length 500-E of the edge. It should be noted that positioning the device 10 at the aforementioned middle point 500-EM allow best coverage of the entire water body 500, or of the entire area of interest of a huge water body 500.

According to one embodiment, which may be combined with each other embodiment described herein, the device 10 is positioned in a fixed position. In other words, the device 10 is always pointing towards a certain area, thus acquiring images of the same area. This embodiment is relevant, for example, to a device 10 that is positioned in a manner that allows acquiring images of the entire water body 500.

According to another embodiment, which may be combined with each other embodiment described herein, the device 10 is configured to change its position, or its angle, relative to water body 500. In other words, the device 10 can move, or turn, or rotate, in a manner that changes the area towards which the device 10 points. This embodiment is relevant, for example, to a device 10 that is positioned in a manner that allows acquiring images of at least part of the body water 500, or its vicinity, and therefore there is a need to occasionally point towards another area that was not covered by the device 10 previously.

According to one embodiment, which may be combined with each other embodiment described herein, the device 10 is configured to be installed in any manner that allows positioning the device 10 in a desired distance and height relative to the water body 500. As can be seen in FIG. 1, the device 10 is installed on a pole 300, or a column 300. This embodiment is only exemplary and should not be considered as limiting the scope of the present subject matter. Alternatively, the device 10 is configured to be installed on any high object, like a pole 300 or column 300 as mentioned above, on a wall, on a tree, on a roof of a building, and the like.

Figure 2:
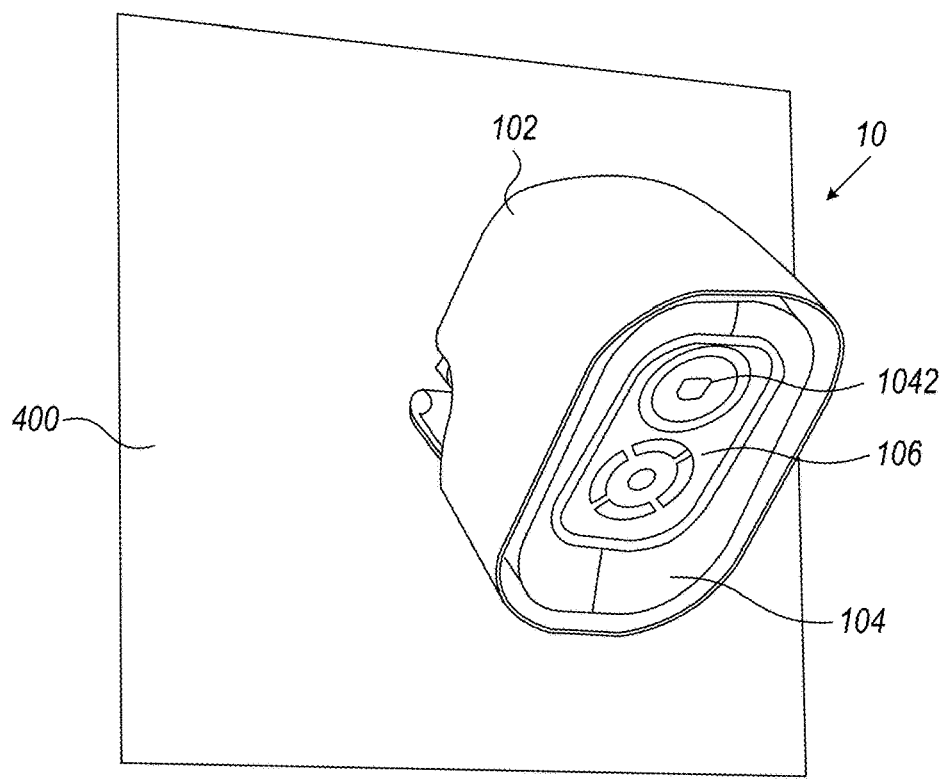
FIG. 2 schematically illustrates, according to an exemplary embodiment, a front perspective view of a device installed on a wall.

Referring now to FIG. 2, schematically illustrating, according to an exemplary embodiment, a front perspective view of a device installed on a wall. FIG. 2 illustrates an exemplary embodiment, which may be combined with each other embodiment described herein, of a device 10 installed on a wall 400, as mentioned above. Some of the components of the device are shown in FIG. 2.

According to one embodiment, which may be combined with each other embodiment described herein, the device 10 comprises a body 102 configured to accommodate components of the device 10. According to another embodiment, which may be combined with each other embodiment described herein, the body 102 is open at its front side in order to allow insertion of components of the device 10 therein during manufacture of the device 10. According to yet another embodiment, which may be combined with each other embodiment described herein, the device 10 further comprises a front cover 104 installed over and covering the open front side of the body 102. According to still another embodiment, which may be combined with each other embodiment described herein, the front cover 104 comprises a plurality of openings 1042 configured to allow passage of light to, or from, components of the device 10 that are accommodated inside the body 102. According to a further embodiment, which may be combined with each other embodiment described herein, the device 10 further comprises a transparent cover 106 installed over the front cover 104 and configured to cover the plurality of openings 1042 of the front cover 104, while allowing passage of light therethrough.

According to one embodiment, which may be combined with each other embodiment described herein, the body 102, the front cover 104 and the transparent cover 106 are configured to protect components of the device 10 that are accommodated in the body 102 from objects and conditions that can damage the components of the device 10, for example, but not limited to, sunlight, heat, cold temperatures, humidity or moisture, water, dirt, dust and the like. According to another embodiment, which may be combined with each other embodiment described herein, the body 102, the front cover 104 and the transparent cover 106 are sealed in a manner that prevents penetration of water, or moisture, or humidity into the device 10 to internal components of the device 10. According to yet another embodiment, which may be combined with each other embodiment described herein, a level of sealing of the device is IP66.

Figure 3:
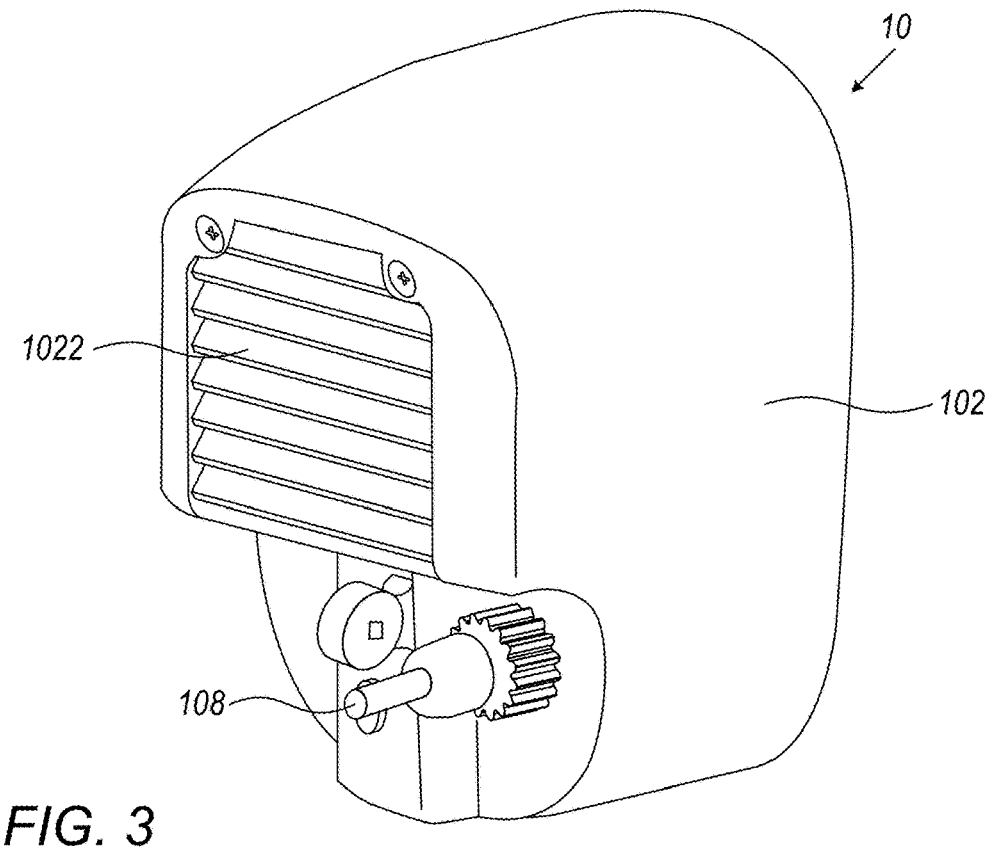
FIG. 3 schematically illustrates, according to an exemplary embodiment, a back perspective view of a device.

Referring now to FIG. 3, schematically illustrating, according to an exemplary embodiment, a back perspective view of a device. FIG. 3 illustrates some additional embodiments and components of the device 10. According to one embodiment, which may be combined with each other embodiment described herein, the body 102 comprises at its back part a plurality of ventilation slits 1022 configured to allow ventilation of components of the device 10 that are accommodated inside the body 102.

According to another embodiment, which may be combined with each other embodiment described herein, the device further comprises a switch 108 on a surface of the device 10. As shown in FIG. 3, the switch 108 protrudes out of a back side of the body 102. However, this embodiment should not be considered as limiting the scope of the present subject matter. The switch 108 can be positioned at any location on the surface of the deice 10, for example on the body 102, or on the front cover 104 and the like.

According to one embodiment, which may be combined with each other embodiment described herein, the switch 108 is configured to switch-on, or switch-off, or switch-on and switch-off operation of the device 10. However, it should be noted that the switch 108 is only an exemplary embodiment of the present subject matter. According to another embodiment, which may be combined with each other embodiment described herein, the device 10 does not comprise a switch 108. According to this embodiment, the device 10 is configured to be switched-on, or switched-off, or switch-on and switched-off remotely, for example by a computing device connected to the device 10.

Figure 4:
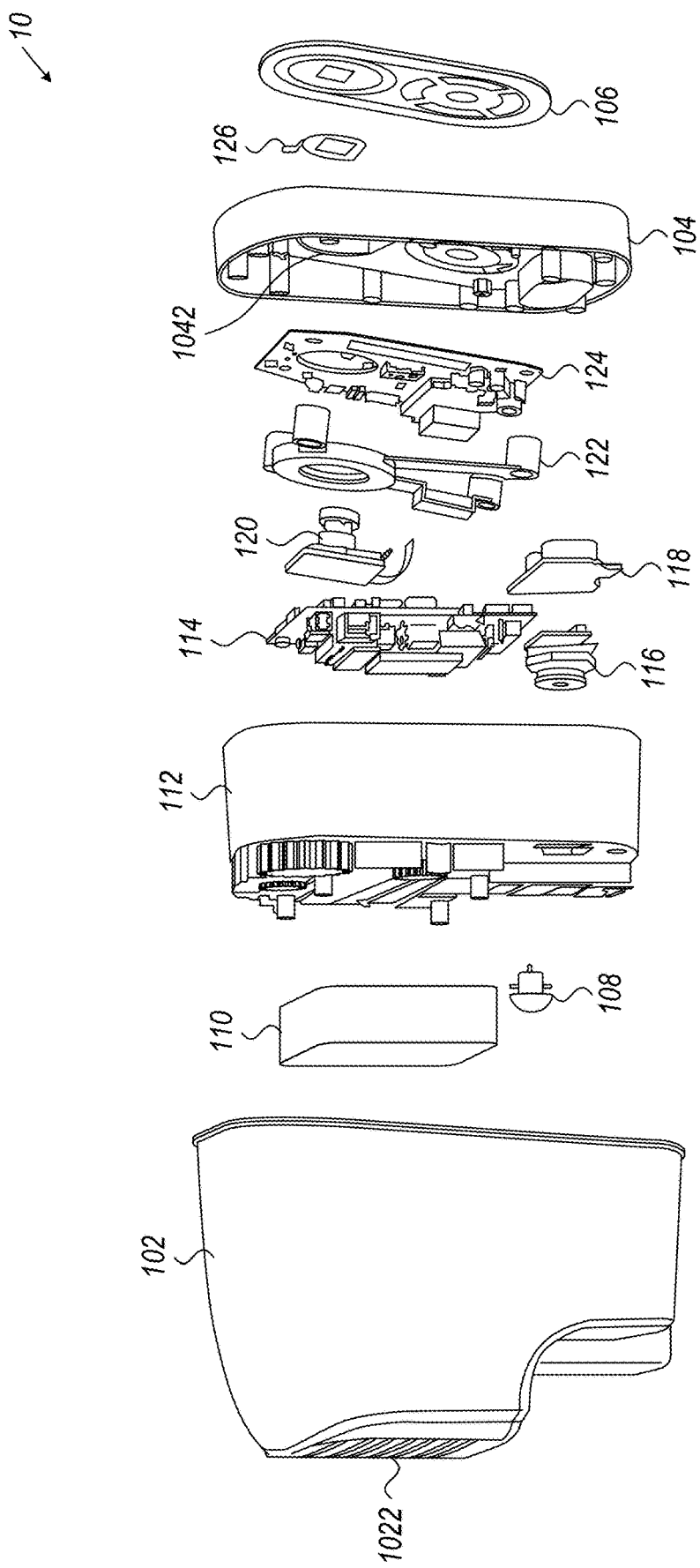
FIG. 4 schematically illustrates, according to an exemplary embodiment, an exploded view of a device.

Referring now to FIG. 4, schematically illustrating, according to an exemplary embodiment, an exploded view of a device. FIG. 4 illustrates in detail components of the device 10, of which some were described previously. FIG. 4 shows the body 102, the plurality of ventilation slits 1022 on the body 102, the front cover 104, the plurality of openings 1042 in the front cover 104, the transparent cover 106, and the switch 108.

According to one embodiment, which may be combined with each other embodiment described herein, the device comprises a ventilator 110 residing inside the body 102, connected to the motherboard 114 and configured to ventilate components of the device 10 that are accommodated in the body 102. The ventilator 110 is used, for example, to cool down components of the device 10 that are heated during operation and there is a need to lower the temperature of these components in order to prevent damaging of these components due to the heat. According to another embodiment, which may be combined with each other embodiment described herein, the ventilator 110 is positioned in s vicinity of the plurality of ventilation slits 1022 of the body 102, in order to allow dispersing of heated air from an inner part of the body 102 out through the ventilation slits 1022, or entrance of cooled air from outside into the inner part of the body 102 though the ventilation slits 1022.

According to one embodiment, which may be combined with each other embodiment described herein, the device 10 further comprises an inner shell 112 configured to fit inside the body 102 and accommodate therein components of the device 10. According to another embodiment, which may be combined with each other embodiment described herein, the inner shell 112 is configured to provide additional protection to the components accommodated therein, in addition to the body 102. According to yet another embodiment, which may be combined with each other embodiment described herein, the inner shell 112 is made of a rigid material, for example a metal, like aluminum and the like.

According to one embodiment, which may be combined with each other embodiment described herein, the device 10 further comprises a motherboard 114 residing inside the body 102 and configured to perform computational actions related to the operation of the device 10. According to another embodiment, which may be combined with each other embodiment described herein, the motherboard 114 comprises at least one artificial intelligence (AI) algorithm and is configured to operate the at least one AI algorithm. According to yet another embodiment, which may be combined with each other embodiment described herein, the motherboard 114 comprises a Graphics Processing Unit (GPU) configured to process images acquired by the imaging device 120 during the operation of the AI algorithms. According to still another embodiment, which may be combined with each other embodiment described herein, the motherboard 114 comprises a timer configured to measure time periods when desired.

According to one embodiment, which may be combined with each other embodiment described herein, the device 10 further comprises a connector 116 configured to connect the motherboard 114 to the inner shell 112.

According to one embodiment, which may be combined with each other embodiment described herein, the device 10 further comprises at least one buzzer 118 residing inside the body and connected to the motherboard 114 and configured to generate a sound, for example an alarm sound. According to another embodiment, which may be combined with each other embodiment described herein, the at least one buzzer 118 is configured to generate a sound that can be heard by people at any place in a vicinity of the device 10, so the people could be notified that there is a drowning event. According to yet another embodiment, which may be combined with each other embodiment described herein, the at least one buzzer 118 is configured to generate a sound in a volume of substantially 86 db.

According to one embodiment, which may be combined with each other embodiment described herein, the device 10 further comprises an imaging device 120 residing inside the body 102 and connected to the motherboard 114 and configured to acquire images. Any type of image is under the scope of the present subject matter, for example, but not limited to: stills images, video images, colored images, black and white images, visible light images, night vision images, thermal images and the like, and any combination thereof.

According to one embodiment, which may be combined with each other embodiment described herein, the imaging device 120 is configured to acquire visible-light images. According to another embodiment, which may be combined with each other embodiment described herein, the imaging device 120 is configured to acquire thermal images. According to yet another embodiment, which may be combined with each other embodiment described herein, the imaging device 120 is configured to acquire both visible-light images and thermal images.

According to one embodiment, which may be combined with each other embodiment described herein, the imaging device 120 is a closed-circuit television (CCTV).

According to one embodiment, which may be combined with each other embodiment described herein, the device 10 further comprises a holder 122 configured to hold the imaging device 120 in place.

According to one embodiment, which may be combined with each other embodiment described herein, the device 10 further comprises an illumination element 124 comprising at least one light source, connected to the mother board 114 and configured to illuminate externally to the device 10. An exemplary light source can be at least one light-emitting diode (LED).

According to one embodiment, which may be combined with each other embodiment described herein, the illumination element 124 is configured to emit visible light. According to one embodiment, which may be combined with each other embodiment described herein, the illumination element 124 is configured to illuminate visible light of at least one different wavelength, or in other words, to emit light of in least one different color. This embodiment can be achieved by using different LEDs configured to emit light in different colors. According to a further embodiment, which may be combined with each other embodiment described herein, the illumination element 124 is configured to emit a warning light, for example when a drowning event is detected by the device 10. The warning light can be, for example, red light. According to yet a further embodiment, which may be combined with each other embodiment described herein, the illumination element 124 is configured to emit at least one indication light. One exemplary indication light, can be light that indicates proper operation of the device 10, for example blue light. Another exemplary indication light, can be light that indicates malfunction of the device, for example yellow light.

According to one embodiment, which may be combined with each other embodiment described herein, the illumination element 124 is configured to emit continuous light when necessary. According to another embodiment, which may be combined with each other embodiment described herein, the illumination element 124 is configured to emit blinking light necessary.

According to one embodiment, which may be combined with each other embodiment described herein, the illumination element 124 is configured to illuminate Infra-red light. According to another embodiment, which may be combined with each other embodiment described herein, the illumination element 124 is configured to illuminate infra-red light at a wavelength of substantially 850 nm. According to yet another embodiment, which may be combined with each other embodiment described herein, the illumination element 124 is configured to emit infer-red light to a distance that covers the entire water body 500, for example an entire swimming pool 500. According to still another embodiment, which may be combined with each other embodiment described herein, the illumination device 124 is configured to emit infra-red light to a distance that covers a part of the water body 500, where swimmers can be present, for example, an area of a lake, a sea and the like, where swimmers can be present. According to a further embodiment, which may be combined with each other embodiment described herein, the illumination device 124 is configured to emit infra-red light to a distance of substantially 12 meters.

According to one embodiment, which may be combined with each other embodiment described herein, each one of the ventilator 110, the at least one buzzer 118, the imaging device 120 and the illumination element 124 is separately connected to the motherboard 114, and its operation is separately controlled by the motherboard 114.

According to one embodiment, which may be combined with each other embodiment described herein, the device 10 is configured to operate indoors, for example in a closed space, like in a building housing a swimming pool, a bath tub, a hot tub and the like. According to another embodiment, which may be combined with each other embodiment described herein, the device 10 is configured to operate outdoors, for example near an open swimming pool, near a lake, near the sea and the like. According to yet embodiment, which may be combined with each other embodiment described herein, the device 10 is configured to operate in any weather condition, during any season. According to still another embodiment, which may be combined with each other embodiment described herein, the device 10 is configured to operate under illuminated conditions, for example during the day, during the night when the an area of the water body 500 is illuminated by artificial light, indoors in an illuminated room or hall, and the like. According to a further embodiment, which may be combined with each other embodiment described herein, the device 10 is configured to operate during dark conditions, for example during a dark night, inside a dark room or hall, and the like.

According to one embodiment, which may be combined with each other embodiment described herein, under illuminated conditions, the device 10 is configured to acquire images of an area that is illuminated by visible light. According to another embodiment, which may be combined with each other embodiment described herein, under dark conditions, the device 10 is configured to acquire night vision images. According to yet another embodiment, which may be combined with each other embodiment described herein, when desired the device 10 is configured to acquire thermal images.

Still referring to FIG. 4. According to one embodiment, which may be combined with each other embodiment described herein, the transparent cover 106 comprises a polarizing filter configured to polarize light that passes through the transparent cover 106 toward the imaging device 120. When, for example, the sun is positioned in front of the device 10, the direct sunlight may sizzle, or cause light glare, of images acquired by the imaging device 120. Polarizing the light with the polarizing filter that is part of the transparent cover 106 prevents the aforementioned dazzling, or light glare, effect.

According to one embodiment, which may be combined with each other embodiment described herein, the polarizing filter is configured to adapt its polarizing angle according to the position of the sun in relation to the device 10, in order to prevent the dazzling, or light glare, effect, at any time during the day. For example, in relation to this embodiment, the polarizing filter is configured to change its polarizing angle according to the time and date at the location of the device 10.

Still referring now to FIG. 4. According to one embodiment, which may be combined with each other embodiment described herein, the device 10 further comprises a transparent cover heater 126 configured to heat the transparent cover 106. According to another embodiment, which may be combined with each other embodiment described herein, the transparent cover heater 126 is in contact with an inner side of the transparent cover 106. One use of the transparent cover heater 126 is to prevent accumulation of humidity on the transparent cover 106, for example when the ambient temperature is low, or in high humidity conditions. Accumulation of humidity on the transparent cover 106 can mask the view and prevent proper acquiring of images by the imaging devoice 120. Thus, heating of the transparent cover 106 with the transparent cover heater 126 prevents masking of the view with moisture, and allows proper acquisition of images also during cold temperature and high humidity conditions.

Regarding the electrical power that is needed for the operation of the device 10, for example for the operation of the ventilator 110, the motherboard 114, the buzzer 118, the imaging device 120, the illumination element 124 and the transparent cover heater 126—any type of power source is under the scope of the present subject matter, for example, but not limited to: mains power, solar power, Power Over Ethernet (POE), a battery and the like. Any type of battery is under the scope of the present subject matter, for example, but not limited to: disposable battery, rechargeable battery and the like. Thus, according to one embodiment, which may be combined with each other embodiment described herein, components of the device 10 that need electrical power to operate are connected to a power source.

According to one embodiment, which may be combined with each other embodiment described herein, the motherboard 114 is configured to connect to the internet in order to receive data from remote entities and transmit data to remote entities. For example, but not limited to, the internet connection is for receiving operation commands for various aspects of the device 10, like a command to acquire an image, a command to test the at least one buzzer 118 and the like. Other examples for the function of the internet connection include, but not limited to, transmission of images to remote computing devices, transmission of alarm signals to remote computing devices, transmission of data regarding status of operation of the device 10, like a warning of low battery, a warning of malfunction of a component of the device like the at least one buzzer 118, the imaging device 120 the illumination element 124 and the like.

According to one embodiment, which may be combined with each other embodiment described herein, any type of connection of the motherboard 114 with the internet is under the scope of the present subject matter. For example, but not limited to: WiFi connection, Long Term Evolution (LTE) connection, 4G LTE connection, network connection and the like, and any combination thereof. According to another embodiment, which may be combined with each other embodiment described herein, the internet connection is configured to transmit electrical power, known as POE.

According to one embodiment, which may be combined with each other embodiment described herein, the motherboard 114 is configured to connect to a telephone device, in order to transmit alarm signals when a drowning event is detected. Any type of telephone device is under the scope of the present subject matter, including, but not limited to: a wired telephone device, a wireless telephone device, a smartphone and the like.

Referring now to embodiments dealing with an operation of the device 10.

According to one embodiment, which may be combined with each other embodiment described herein, the device 10 is configured to monitor a part of the water body 500 or the area of interest; or the entire water body 500 or area of interest; or an area that is aside to the water body 500 or area on interest; or any combination thereof.

The term "living object" as disclosed herein refers to a human being, or an animal.

The term "event" as disclosed herein refers to an event that happens to a living object, that puts the living object in a danger of death, or injury, that happens in the water body 500, or aside the water body 500. Some exemplary events include, but not limited to: drowning in the water body 500, falling into the water body 500, falling aside the water body 500 and the like.

According to one embodiment, which may be combined with each other embodiment described herein, the device 10 is configured detect an event and send an alarm signal upon the detection of the event.

The term "alarm signal" as disclosed herein refers to any type of signal that is aimed to alert and notify about an occurrence of an event. Any type of alarm signal is under the scope of the present subject matter, for example, but not limited to: a sound alarm signal generated, for example, by the at least one buzzer 118, a light alarm signal generated for example by the illumination element 124, a signal that is sent to a telephone device and triggers ringing of the telephone device, a voice message sent to a telephone device, a visual message sent to a computing device, and the like, and any combination thereof.

According to one embodiment, which may be combined with each other embodiment described herein, the device 10 is configured to generate an alarm signal upon detection of an event.

According to one embodiment, which may be combined with each other embodiment described herein, in order for the device 10 to be able to detect an event, the device 10 is configured to monitor living objects in the entire water body 500, or in a part of the water body 500, or in a part of an area of interest, or in an entire area of interest, or aside the water body 500, or any combination thereof. According to another embodiment, which may be combined with each other embodiment described herein, the monitoring of the at least one living object is performed by acquiring at least one image by the imaging device 120, transmitting the at least one image to the motherboard 114 and analyzing the at least one image by the at least one AI algorithm of the motherboard 114.

According to one embodiment, which may be combined with each other embodiment described herein, the monitoring of the at least one living object comprises: monitoring of at least one living object floating on the water body 500, or monitoring of at least one living object under the water in the water body 500, or monitoring of at least one living object aside the water body 500, or monitoring moving of at least one living object in the water body 500 or aside the water body 500, or monitoring of standing in place of at least one living object in the water body 500, or aside the water body 500, or monitoring direction of movement of at least one living object in the water body 500, or aside the water body 500, or monitoring speed of movement of at least one living object in the water body 500, or aside the water body 500, or any combination thereof.

According to one embodiment, which may be combined with each other embodiment described herein, the moving of the at least one living object can be swimming, walking and the like.

It should be noted that the device 10 of the present subject matter can identify a living object under the water, when the device 10, including the imaging device 120 of the device 10 is positioned above the water, as can be seen in FIG. 1.

According to one embodiment, which may be combined with each other embodiment described herein, the device 10 is configured to distinguish between a living object that is in the water body 500 when a head of the living object is above the water and between a living object that is in the water body 500 when a head of the living object is under the water. When a living object that is in the water body 500 when a head of the living object is under the water is detected, the device 10 is configured to classify this situation as an event.

According to one embodiment, which may be combined with each other embodiment described herein, the device 10 is configured to classify a situation as an event, when the situation is a living object that is entirely under the water in the water body 500, including the head, for more than substantially 20-30 seconds, and the living object is not moving in the water.

According to one embodiment, which may be combined with each other embodiment described herein, the device 10 is configured to classify a situation as an event, when a living object is entirely under the water in the water body 500, including the head, and is moving under the water for more than substantially 45 seconds.

According to one embodiment, which may be combined with each other embodiment described herein, the device 10 is configured to classify a situation as an event, when there is only one living object in the water body 500, and there is no human being aside the water body 500, and the living object is entirely under the water, including the head, for more than substantially 15-20 seconds.

According to one embodiment, which may be combined with each other embodiment described herein, the device 10 is configured to classify a situation as an event, when there is only one living object in the water body 500, and at least one human being aside the water body 500, and that living object that is in the water body 500 is entirely under the water, including the head, for more than substantially 30 seconds.

According to one embodiment, which may be combined with each other embodiment described herein, the device 10 is configured to classify a situation as an event, when at least one living object is detected inside the water body 500, or aside the water body 500, during the night.

According to one embodiment, which may be combined with each other embodiment described herein, the device 10 is configured to operate continuously. According to another embodiment, which may be combined with each other embodiment described herein, the device 10 is configured to operate for predetermined period of time.

According to one embodiment, which may be combined with each other embodiment described herein, the device 10 is configured to be switched on, or switched off, or a combination thereof, by using the switch 108. According to another embodiment, which may be combined with each other embodiment described herein, the device 10 is configured to be switched on, or switched off, or a combination thereof, remotely, for example by a remote computing device. According to another embodiment, which may be combined with each other embodiment described herein, the device 10 is configured to be switched off for a predetermined period of time and then to switch on back. Any period of time for switching off the device 10 is under the scope of the present subject matter, for example, but not limited to: 15 min, 30 min, 1 hour, 3 hours and the like.

According to one embodiment, which may be combined with each other embodiment described herein, the device 10 is configured to switch on an illumination of light by the illumination element 124 when a human being is detected entering into the water body 500. An exemplary purpose of this embodiment is to notify the human being that the device 10 is operating and monitoring.

According to one embodiment, which may be combined with each other embodiment described herein, the AI algorithms are configured to be trained during a training process in which the AI algorithms are configured to learn to distinguish between events and situations that are not events. During an exemplary training process, the device 10 acquires images of living objects in situations that are events, and images of living objects in situations that are not events. Then, the images are annotated as events, or no-events, by an operator of the device 10, and the annotated images are provided to the AI algorithms for learning to distinguish between event and no-event situation.

According to one embodiment, which may be combined with each other embodiment described herein, the device 10 is configured to combine visual light images and thermal images in the process of determining whether a situation is an event or no-event. This embodiment utilizes the nature of the two types of images. The visual light images allow detection of a living object outside the water body 500, parts of a living object that are above the water when the living object is in the water body 500, parts of the living object that are under the water, and a living object that is entirely under the water. However, the thermal images allow detection of only a living object outside the water body 500 and parts of a living object that are above the water when the living object is in the water body 500. The thermal images do not detect parts of the living object that are under the water, and a living object that is entirely under the water. Therefore, analysis of both the visual light images and the thermal images by the AI algorithms can be used to determine whether a living object is in an event, or no-event, situation.

According to one embodiment, which may be combined with each other embodiment described herein, the device 10 is configured to make one image that is a combination of a visual light image and a thermal image of a certain living object, and according to the trained AI-algorithms determine whether the living object is in an event, or no-event, situation.

It is appreciated that certain features of the subject matter, which are, for clarity, described in the context of separate embodiments, may also be provided in combination in a single embodiment. Conversely, various features of the subject matter, which are, for brevity, described in the context of a single embodiment, may also be provided separately or in any suitable sub combination.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. An artificial intelligence (AI)-based image acquiring device for monitoring water bodies, the device comprising:
   a body configured to accommodate components of the device, wherein the body is open at its front side;
   a front cover installed over and covering the open front side of the body;
   a motherboard residing inside the body and configured to perform computational actions related to the operation of the device and optionally to connect to the internet in order to receive data from remote entities and transmit data to remote entities;
   at least one buzzer residing inside the body and connected to the motherboard and configured to generate a sound, for example an alarm sound;
   an imaging device residing inside the body and connected to the motherboard and configured to acquire images;
   a transparent cover installed over the front cover and configured to cover the plurality of openings of the front cover, while allowing passage of light therethrough,
   a transparent cover heater configured to heat the transparent cover; and
   a ventilator residing inside the body, connected to the motherboard, and configured to ventilate components of the device that are accommodated in the body,
   wherein components of the device that need electrical power to operate are connected to a power source,
   wherein the device is configured to be positioned aside a water body at a distance from the water body such that the imaging device monitors the water body from a side perspective, and monitor at least one living object in a region of interest that includes at least part of the water body, and the device is further configured to distinguish between a living object that is in the water body when a head of the living object is above the water and between a living object that is in the water body when a head of the living object is under the water, and produce an alert signal when an event is detected in the region of interest, and
   wherein the event is a situation in which the at least one living object is in a danger of death, or injury, and
   wherein the front cover comprises a plurality of openings configured to allow passage of light to, or from, components of the device that are accommodated inside the body.

2. The device of claim 1, wherein the transparent cover comprising a polarizing filter configured to polarize light that passes through the transparent cover toward the imaging device.

3. The device of claim 1, wherein the transparent cover heater is in contact with an inner side of the transparent cover.

4. The device of claim 1, wherein the body, the front cover and the transparent cover are sealed in a manner that prevents penetration of water, or moisture, or humidity into the device to internal components of the device.

5. The device of claim 1, wherein the body comprising at its back part a plurality of ventilation slits configured to allow ventilation of components of the device that are accommodated inside the body.

6. The device of claim 1, further comprising a switch on a surface of the device, wherein the switch is configured to switch-on, or switch-off, or switch-on and switch-off operation of the device.

7. The device of claim 1, wherein the device is configured to be switched-on, or switched-off, or switch-on and switched-off remotely.

8. The device of claim 1, further comprising an inner shell configured to fit inside the body and accommodate therein components of the device.

9. The device of claim 8, further comprising a connector configured to connect the motherboard to the inner shell.

10. The device of claim 1, further comprising an illumination element comprising at least one light source, connected to the motherboard and configured to illuminate externally to the device.

11. The device of claim 1, further comprising a holder configured to hold the imaging device in place.

12. The device of claim 1, wherein the motherboard comprises at least one AI algorithm and is configured to operate the at least one AI algorithm.

13. The device of claim 12, wherein the monitoring of the at least one living object is performed by acquiring at least one image by the imaging device, transmitting the at least one image to the motherboard and analyzing the at least one image by the at least one AI algorithm of the motherboard.

14. The device of claim 1, the monitoring of the at least one living object comprises: monitoring of at least one living object floating on the water body, or monitoring of at least one living object under the water in the water body, or monitoring of at least one living object aside the water body, or monitoring moving of at least one living object in the water body or aside the water body, or monitoring of standing in place of at least one living object in the water body, or aside the water body, or monitoring direction of movement of at least one living object in the water body, or aside the water body, or monitoring speed of movement of at least one living object in the water body, or aside the water body, or any combination thereof.

15. The device of claim 1, wherein the device is configured to classify a situation as an event, when the situation is a living object that is entirely under the water in the water body, including the head, for more than 10 seconds, and the living object is not moving in the water.

\* \* \* \* \*